(12) United States Patent
Hallenstål et al.

(10) Patent No.: US 7,644,178 B2
(45) Date of Patent: Jan. 5, 2010

(54) END TO END TEST BETWEEN GATEWAYS IN A IP NETWORK

(75) Inventors: Magnus Hallenstål, Täby (SE); Tomas Nylander, Stavsnäs (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 589 days.

(21) Appl. No.: 10/521,932

(22) PCT Filed: Jul. 25, 2002

(86) PCT No.: PCT/SE02/01411

§ 371 (c)(1),
(2), (4) Date: Nov. 15, 2005

(87) PCT Pub. No.: WO2004/012403

PCT Pub. Date: Feb. 5, 2004

(65) Prior Publication Data

US 2006/0174006 A1    Aug. 3, 2006

(51) Int. Cl.
*G06F 15/173* (2006.01)
*G01R 31/08* (2006.01)
*H04J 1/00* (2006.01)

(52) U.S. Cl. .......... 709/238; 370/248; 370/249

(58) Field of Classification Search ........ 709/238, 709/218, 249, 232, 224, 226; 370/249, 352, 370/401, 466, 384, 385, 389; 379/114, 126; 714/715, 716, 714

See application file for complete search history.

(56) References Cited

U.S. PATENT DOCUMENTS

| | | | |
|---|---|---|---|
| 5,359,649 A * | 10/1994 | Rosu et al. | 379/221.07 |
| 5,477,531 A * | 12/1995 | McKee et al. | 370/249 |
| 6,233,237 B1 * | 5/2001 | Yucebay et al. | 370/384 |
| 6,404,870 B1 * | 6/2002 | Kia et al. | 379/144.01 |
| 6,466,548 B1 * | 10/2002 | Fitzgerald | 370/249 |
| 7,054,273 B1 * | 5/2006 | Scholtens et al. | 370/248 |
| 2001/0021176 A1 * | 9/2001 | Mimura et al. | 370/235 |
| 2002/0006136 A1 * | 1/2002 | Mallory et al. | 370/466 |
| 2002/0016937 A1 * | 2/2002 | Houh | 714/43 |
| 2002/0052970 A1 * | 5/2002 | Petersen et al. | 709/238 |

FOREIGN PATENT DOCUMENTS

WO    WO 0230042 A2    4/2002

OTHER PUBLICATIONS

Fineberg, V.: A practical architecture for implementing end-to-end QoS in an IP network. In IEEE Communications magazine, pp. 122-130 vol. 40 Jan. 2002.
Bin Pang et al: An admission control scheme to provide end-to-end statistical QoS provision in IP networks. In: Performance, Computing and Communication Conference, 2002 21st IEEE International, Apr. 3, 2002-Apr. 5, 2002, on pp. 399-403.

* cited by examiner

*Primary Examiner*—Nathan J Flynn
*Assistant Examiner*—Mark O Afolabi

(57) ABSTRACT

The present invention relates to methods and arrangements to test end to end relations between gateways MGW1, MGW2 in an IP network IPNW, which method comprises the following steps: 1) reserving call handling resources CH231-CH260 in a destination gateway MGW2; 2) sending data packets RTP/UDP/IP from an originating gateway MGW1 to the reserved call handling resources CH231-CH260; 3) looping back the received data packets RTP/UDP/IP, from the destination gateway MGW2 to the originating gateway MGW1; 4) providing quality statistics for the received data packets, in the originating gateway MGW1.

4 Claims, 3 Drawing Sheets

END TO END TEST BETWEEN GATEWAYS IN A IP NETWORK

TECHNICAL FIELD OF THE INVENTION

The present invention relates to methods and arrangements to test end to end relations between gateways in an IP network.

DESCRIPTION OF RELATED ART

Today there is a demand for services offering real time traffic over an Internet Protocol IP network. For example when establishing a connection for IP-telephony, the users demand real time traffic. In order to meet this demand a transport protocol named Real Time Protocol RTP has been developed. A problem is that when an IP network is used to transport voice, using RTP/UDP/IP (UDP: User Datagram Protocol), there are no means or standards to test or ensure that the quality provided by the IP transport network is sufficient. In the European Patent Application EP 1102432A2 is disclosed a network management procedure where a potential service route is treated preferentially if each of its links has available capacity that is more than sufficient by a specified margin. Quality problem may however arise for example in case a node has reduced its traffic towards another entity, and wants to increase it. How does it know that capacity in the network is available? Another problem area is when for example a new media gateway MGW is installed in the IP network. It then must be verified that the IP network and the already existing media gateways can handle the estimated additional traffic resulting from taking the new MGW into service. Also after failure in the IP network or in an MGW, testing should be performed before real traffic is allowed, in order to avoid that the end users experience bad voice quality.

A well-known principle, so called PING, has been used to see if the other end responds. PING means sending out and distributing a PING signal through the entire network. The problem with ping is that if media gateways have a number of interfaces and by that also a number of IP addresses, then it is the aggregated traffic between the gateways that is of interest, not traffic to individual interface. If a MGW would use PING to test the network availability to a remote MGW, it must know the flows on each and every interface at the remote MGW, and also how the existing traffic change in real time, since traffic to the remote MGW might change over time. In addition due to policy routing, paths may be different for RTP and PING.

Another known method to obtain statistics is to use a protocol mechanism called RTCP (Real Time Control Protocol). RTCP is used for gathering statistics about an RTP session. The RTCP can collect and output information regarding statistics such as delay, jitter and packet-loss ratio. In the European Patent Application EP 1 168 755 A1 a method is disclosed where an Internet Protocol telephony gateway is given a threshold for the performance indicator of the RTCP, and only accepts an incoming call if the present value of the performance indicators are below the given threshold value. By monitoring the quality of ongoing calls, the IP telephony gateway in the EP application determines whether or not to accept a new incoming call. Thus for each individual call it is possible to obtain statistics relating to the quality of the call. However, since remote gateways may carry live traffic it is desirable that they can be relieved from the burden of producing statistics. Furthermore, RTCP means increased software complexity with increased cost as a consequence. Besides, if RTCP are to be used, there is still a need to indicate an RTP flow as a test flow since if it is not a test flow it can only be real time traffic or traffic not meant for this gateway. A test flow needs to be handled differently compared with real traffic. There is also a need to have a test for both ways, which is not supported when using RTCP.

SUMMARY OF THE INVENTION

The present invention solves problems related to test of an aggregated end to end relation between two gateways in an IP network, an originating gateway and a destination gateway. The present invention solves a problem how to test the end to end relation in a two-way direction. Another problem solved by the invention is how to minimise disturbance of live traffic during test.

A purpose with the invention is to ensure the quality that is provided by the IP transport network is sufficient to handle certain situations.

The problems are solved by the invention by sending data packets from the originating gateway to the destination gateway and then loop back the packets. After loop back from the destination gateway, quality statistics for the received data packets are calculated in the originating gateway.

More in detail, call handling resources are reserved in the destination gateway in the IP network. Data packets are then sent from the originating gateway to the reserved call handling resources in the destination gateway. The data packets received in the destination gateway are looped back from the destination gateway to the originating gateway and quality statistics for the received data packets are calculated in the originating gateway.

An advantage is that special test programs done by a gateway does not have to be synchronised with other gateways in the IP network.

Another advantage by the invention is that software complexity can be reduced while accurate statistics still can be produced in the gateway that undergoes test.

Another advantage with the invention is that quality statistics can be calculated for data packets having passed both ways of an end to end connection.

The invention will now be described more in detail with the aid of preferred embodiments in connection with the enclosed drawings.

DETAILED DESCRIPTION OF EMBODIMENTS

Figure 1:
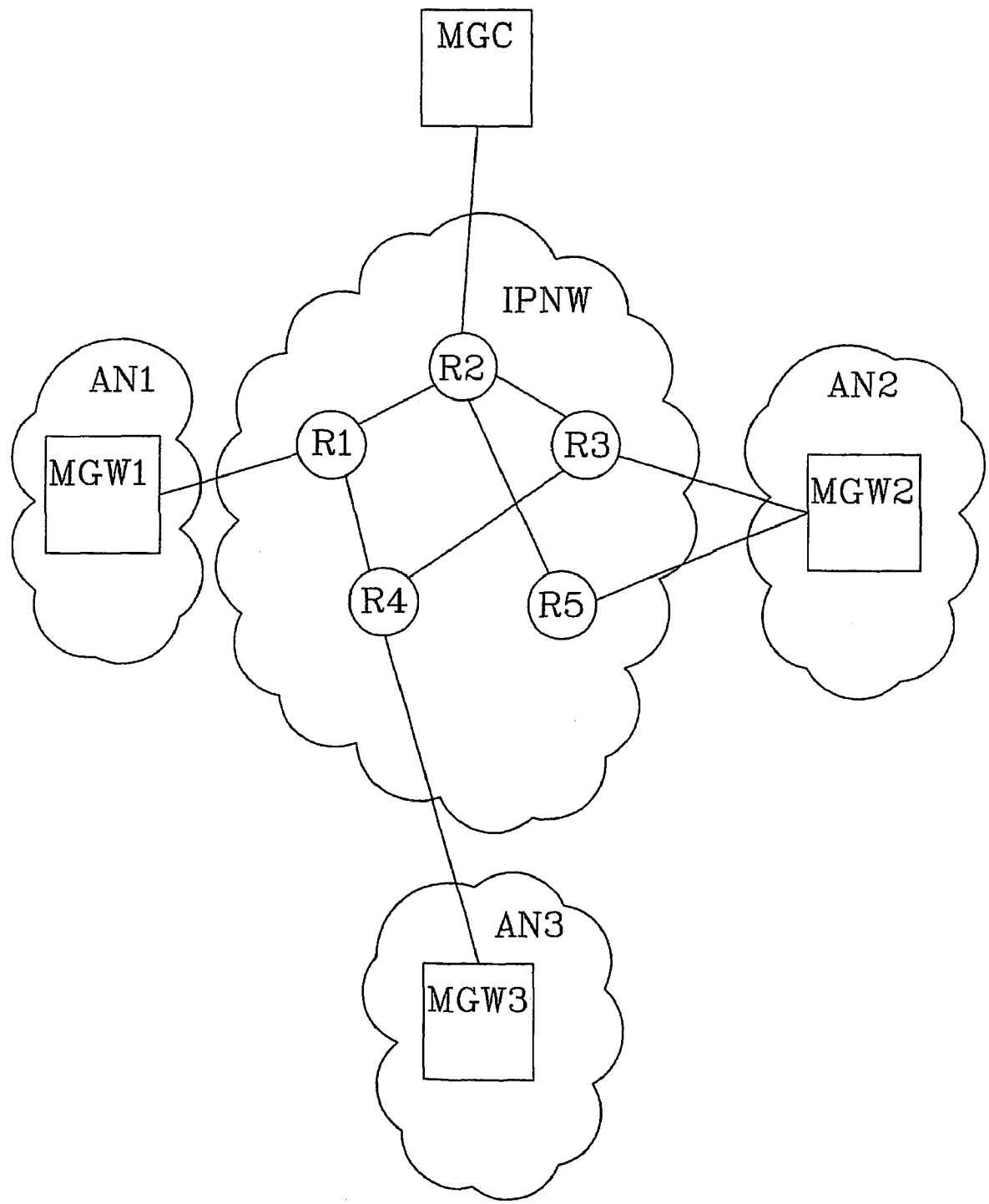
FIG. 1 shows a block schematic diagram of an IP network in which a media gateway controller controls a number of media gateways.

FIG. 1 discloses a general view of a telephony network. The network comprises a number of subscribers (not shown in the figure) connected to a number of access networks AN1-AN3. Each access network is connected to a media gateway MGW1-MGW3. An Internet Protocol Core Network IPNW interconnects the media gateways. The gateways MGW1-MGW3 are connected to a Media Gateway Controller MGC as indicated in the figure. The controller MGC controls the media gateways according to the ITU-T H.248 architecture. Routers R1-R5 conduct the traffic between the media gateways MGW1-MGW3 and between the gateways and the controller MGC.

Figure 2:
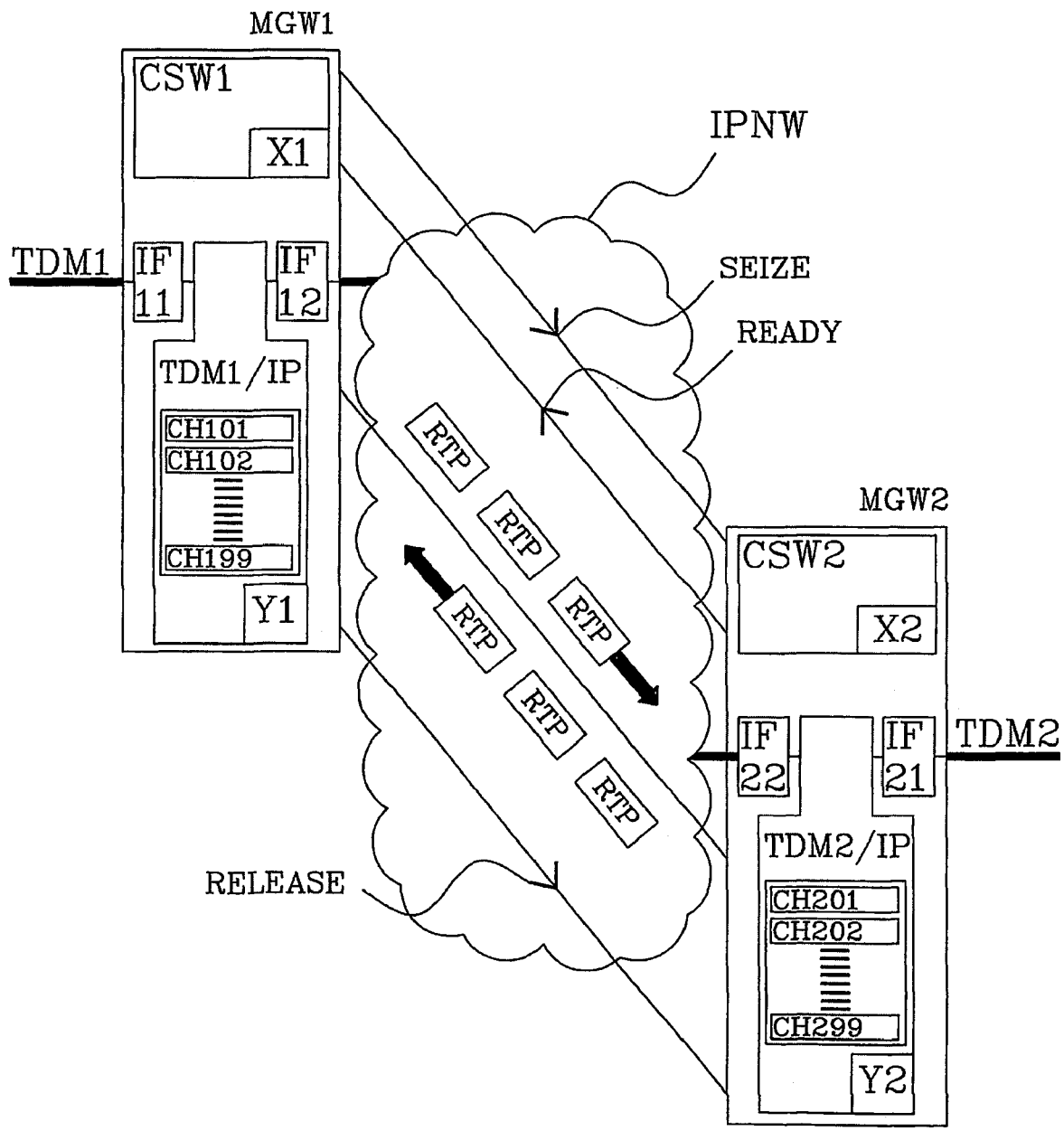
FIG. 2 shows a test session performed between an originating gateway and a destination gateway.

FIG. 2 discloses the originating media gateway MGW1 and the destination media gateway MGW2 from FIG. 1. The media gateways MGW1 and MGW2 are interconnected via the Internet Protocol Network IPNW. The routers shown in FIG. 1 have been left out in FIG. 2 for the sake of clarity.

The originating gateway MGW1 is associated through a first Time Division Multiplex link TDM1 to an access network AN1 (se FIG. 1). A first interface IF11 in the gateway MGW1 is connected between the link TDM1 and a converter TDM1/IP in MGW1. The converter is connected to the IP network via a second interface IF12. A purpose of the converter TDM1/IP is to convert TDM signals into IP signals and vice versa. The converter comprises terminating hardware such as call-handling resources, i.e. channels CH101-CH199. A call handling resource can be defined either as an originating port or as a destination port. This definition is used in RTP/UDP/IP packets sent between the gateways, whereby the originating port defines the port from which a packet is sent and the destination port defines the port for which the packet is destined.

The originating gateway MGW1 comprises a control software unit CSW1 located in a so-called control plane of the gateway. A purpose with the control software is to manage the converter TDM1/IP. Each media gateway in the telephone network is provided with test software. The control software CSW1 comprises a test software block X1 used to manage the converter TDM1/IP during a test session and evaluate the result from a test. The test will be explained later in the description. The first converter TDM1/IP comprises another test software block Y1 located in a so-called user plane in the gateway. Y1 is used to handle the flow of data packets sent between the originating gateway MGW1 and the destination gateway MGW2 during a test session and to perform measurements that will be used for test evaluation. The destination gateway MGW2 comprises corresponding entities to the entities in MGW1. The corresponding entities in MGW2 are shown in FIG. 2 with the following reference signs: CSW2, IF21, TDM2/IP, CH201-CH299, IF22, X2 and Y2. The function of these entities is the same as the function of the entities in MGW1 and will not be further explained.

The test according to the invention will now be explained more in detail. A prerequisite for the test is that software X1, Y1, X2, Y2 used to manage the test has been implemented in all gateways that will be involved in the test. The test might be initiated for reasons to find out if capacity is available, for example after a node has reduced its traffic towards another entity and wants to increase it, or when a new gateway has been installed in the network. The test might be used to verify that traffic engineering in the IPNW has been done correctly. Test might also be initiated (automatically or manually) after failure in the IP network or a media gateway, in order to ensure that the problem is resolved before real traffic is allowed again. The test might also be initiated manually by an operator. In this example, an operator manually initiates an end to end test between MGW1 and MGW2 by order the test and specify that estimated traffic from MGW1 to MGW2 is thirty simultaneous calls. The software block X1 in the first control software CSW1 now sets up a test session starting with reserving resources in MGW1 and sending a seizure signal SEIZE from the first media gateway MGW1 to the control software CSW2 in the second media gateway MGW2. The seizure signal comprises information that defines which interface to use and the desired number of call handling resources to be used for the test, thirty in this example. The seizure signal could also comprise information about what CODEC to use in order to verify supported codec's. As an option, the seizure signal may also contain information that defines the time during which the test will go on. After initiation of the test in the originating gateway thirty resources CH151-CH180 are reserved in TDM1/IP in the originating gateway and after establishment of a session, the seizure signal SEIZE is sent from the originating gateway MGW1 to the destination gateway MGW2. After reception of the seizure signal by the control software CSW2 in the destination gateway, the test software X2 in the control software in MGW2 finds out available call handling resources in the converter TDM2/IP in the second gateway MGW2 according to the specification in the seizure signal. The number of desired call-handling resources is thirty, since thirty simultaneous call was specified by the operator. If the desired number of resources was available, an acknowledgement signal READY indicating available call handling resources CH231-CH260, is sent from the destination gateway MGW2 to the originating gateway MGW1. The control software CSW1 in the first media gateway MGW1 receives the information in the acknowledgement signal. The test software X1 now configures the thirty already reserved resources CH151-CH180 with right data and prepares the sending of RTP/UDP/IP packets. The packets are to be sent from the reserved originating call handling resources CH151-CH180 in the originating media gateway MGW1 to the specified available destination call handling resources CH231-CH260 defined in the acknowledgement signal READY. RTP/UDP/IP packets are sent from CH151-CH180 in MGW1 to CH231-CH260 in MGW2. The packets are sent in accordance with the operator specification e.g. the defined thirty simultaneous calls, G.711 Codec and 5 ms of speech in each packet. Each RTP/UDP/IP packet comprises a header in which call handling resources (destination/originating IP address and ports) are defined. In one field in the header an originating call handling resource CH165 in MGW1 is defined (originating IP address and port), and in another field in the header, a destination call handling resource CH252 in MGW2 is defined (destination IP address and port). Data packets are sent from the originating call handling resources to the destination call handling resources. By reception of data packets to the destination gateway MGW2, all packets intended for the picked-out destination call resources CH231-CH260 belong to the test session and will be looped back to the originating gateway. RTP/UDP/IP packets that are intended for other call handling resources belong to live traffic and will not be looped back, but be treated in a convenient way. For all received RTP/UDP/IP packets belonging to the test session, the earlier mentioned fields for originating and destination call handling resources will now be switched over in MGW2. Where earlier the originating call handling resource was defined, now the destination call handling resources is defined, and vice versa. In other words, in a new header the earlier originating call handling resource is now the destination resource and the earlier destination resource is now the originating resource. After the loop back, packets belonging to the test session will be measured regarding drop of packets, round trip delay and jitter, by the test software Y1 in the first media gateway MGW1. After finish of the test session, the reserved call handling resources CH231-CH260 in MGW2 will be released by sending a release signal RELEASE from the originating gateway MGW1 to the destination gateway MGW2. The measurement performed by Y1 is then sent to the test software X1 in the control plane. In X1 an evaluation will take place and quality statistics may be presented to, in this example, the operator. In case the test function was triggered by a background test or a fault case, alarms may be issued/ceased and call control functions may be notified.

Figure 3:
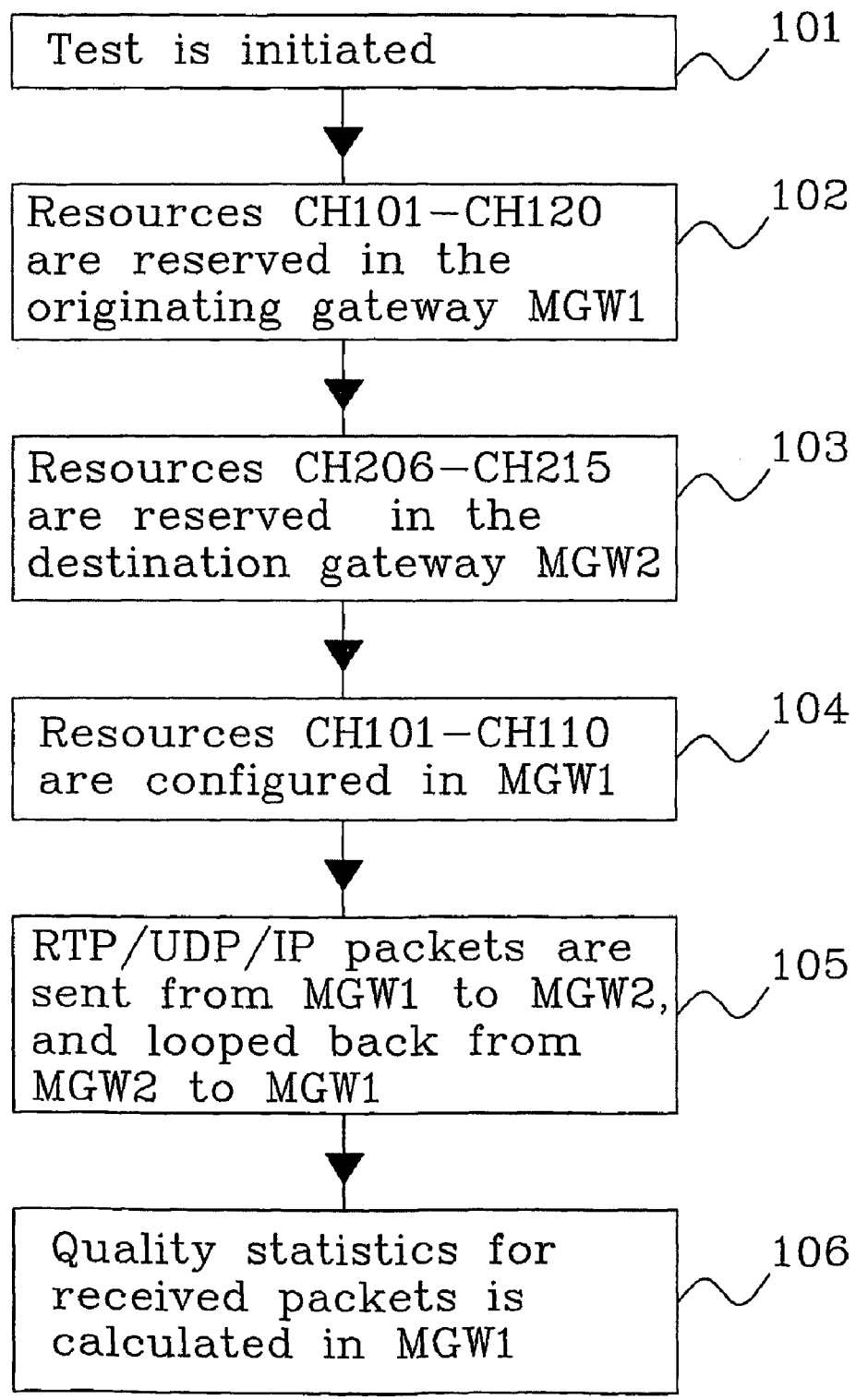
FIG. 3 shows in a flow-chart some essential steps of the invention.

A method according to the invention will now be described. The most essential steps in the method can be seen in the flow chart in FIG. 3. The flow chart is to be read together with the earlier discussed FIGS. 1 and 2. The method shows how two end-to-end relations are tested, A first relation already mention and shown in FIG. 2, between MGW1 and MGW2, and a second end-to-end relation between MGW1 and MGW3. The test in this example is initiated after failure in MGW1. The test is initiated manually before real traffic is allowed in order to avoid loss of real traffic. The method according to the invention, when three media gateways MGW1-MGW3 are involved, comprises the following steps:

An operator initiate the test by specifying that end-to-end tests shall be performed by thirty simultaneous calls between MGW1 and MGW2 and sixty simultaneous calls between MGW1 and MGW3. This is shown in FIG. 3 by a block 101.

The software block X1 in the first control software CSW1 now sets up a test session starting with reserving twenty resources CH101-CH120 in TDM1/IP in the originating gateway MGW1. This is shown in FIG. 3 by a block 102.

A session is established between the originating gateway MGW1 and MGW2 that now is called the second gateway MGW2.

The seizure signal SEIZE is sent from the originating gateway MGW1 to the second gateway MGW2. The seizure signal defines that interface IF22 is to be used during the test. The number of desired call handling resources for the test, i.e. twenty, is also defined in the seizure signal. In this example the test is decided to go on for three minutes.

The test software X2 in-the control software CSW2 in MGW2 tries to find twenty available call handling resources in the converter TDM2/IP in the second gateway MGW2.

In this example only ten call handling resources CH206-CH215 was available and an acknowledgement signal READY indicating the available call handling resources CH206-CH215 is sent from the second gateway MGW2 to the originating gateway MGW1. This is shown in FIG. 3 by a block 103.

The control software CSW1 in the originating media gateway MGW1 receives the information in the acknowledgement signal READY. The test software X1 now configures ten resources CH101-CH110 of the twenty reserved resources CH101-CH120 with right data. X1 prepares sending RTP/UDP/IP packets from the reserved configured originating call handling resources CH101-CH110 in the originating media gateway MGW1, to the specified available destination call handling resources CH206-CH215 that was reserved in MGW2. This is shown in FIG. 3 by a block 104.

The software block X1 in the first control software CSW1 now sets up a test session for the end-to-end test between MGW1 and MGW3, a so called third gateway MGW3, by reserving sixty resources CH121-CH180 in TDM1/IP in the originating gateway MGW1.

A session is established between MGW1 and MGW3.

A second seizure signal is sent from the originating gateway MGW1 to the third gateway MGW3. The seizure signal defines the interface to be used and the number of desired call handling resources i.e. sixty. For this end-to-end test, the test is set to go on for five minutes.

The test software in the control software in MGW3 finds sixty available call handling resources in MGW3.

A second acknowledgement signal indicating the found available call handling resources is sent from the third gateway MGW3 to the originating gateway MGW1.

The control software CSW1 in the first media gateway MGW1 receives the information in the second acknowledgement signal. The test software X1 now configures the sixty reserved resources CH121-CH180 with right data. X1 prepares the sending of RTP/UDP/IP packets from the configured reserved originating call handling resources CH121-CH180 in the originating media gateway MGW1 to the specified available destination call handling resources that was defined in the second acknowledgement signal.

Ten RTP/UDP/IP packets are sent from the originating gateway MGW1 to the second gateway MGW2. Data packets are sent from the reserved call handling resources in MGW1 to the reserved call handling resources in MGW2. By reception of data packets to the second gateway MGW2, all packets intended for the picked-out destination call resources CH206-CH215 belong to the test session and will be looped back to the originating gateway on condition that the specified three minutes time interval not has lapsed. This is shown in FIG. 3 by a block 105.

Sixty RTP/UDP/IP packets are sent from the originating gateway MGW1 to the third gateway MGW3. Data packets are sent from the reserved call handling resources CH121-CH180 in MGW1 to the reserved call handling resources in MGW3. By reception of data packets to the third gateway MGW3, all packets intended for the picked-out destination call resources belong to the test session and will be looped back to the originating gateway on condition that the specified five minutes time interval not has lapsed.

After the loop back, all packets belonging to the test session will be measured regarding drop of packets, round trip delay and jitter by the test software Y1 in the first media gateway MGW1. After finish of the test session, the reserved call handling resources in MGW2 and in MGW3 will be released by sending release signals from MGW1 to MGW2 and from MGW1 to MGW3. The measurement performed by Y1 is sent to the test software X1 in the control plane. In X1 an evaluation will take place and quality statistics are presented to the operator that initiated the test. This is shown in FIG. 3 by a block 106.

Different variations are of course possible within the scope of the invention. Instead of defining call-handling resources to be reserved in the destination gateway before test by sending a seizure signal, e.g. some resources, could be constantly reserved for test in order to supervise basic connectivity between gateways. Other variations are that the chronological order between the steps in the method may vary. The described location of different entities like for example the software used for test purpose may also vary. In other-words, the invention is not limited to the above described and in the drawings shown embodiments but can be modified within the scope of the enclosed claims.

The invention claimed is:

1. A method of testing end to end relations between an originating gateway and a destination gateway in an IP network, said method comprising the steps of:

reserving call handling resources in the originating gateway for an end to end test;

establishing a session between the originating gateway and the destination gateway;

sending a seizure signal from the originating gateway to the destination gateway, said seizure signal indicating that the end to end test is to be performed, which interface to use for the test, a codec to be utilized for the test, and a desired number of call handling resources to be used for the test;

receiving a resource ready acknowledgment signal in the originating gateway from the destination gateway, said acknowledgment signal indicating that the desired number of resources are available in the destination gateway;

configuring the reserved call handling resources in the originating gateway with appropriate data for the test in response to the acknowledgment signal from the destination gateway;

sending a plurality of test data packets with the data for the test to the destination gateway;

distinguishing the test data packets from other data traffic in the destination gateway on the basis of the source address field in the test data packet headers;

looping back the received test data packets from the destination gateway to the originating gateway by exchanging source and destination address fields in the packet headers of the test data packets, while sending other data traffic to defined destinations;

receiving the looped back test data packets in the originating gateway; and calculating quality statistics for the received data packets by the originating gateway, the quality statistics includes dropped packets, round trip delay, and jitter.

2. The method according to claim 1, further comprising specifying in the seizure signal, a time interval for performing the test.

3. An arrangement for testing end to end relations between an originating gateway and a destination gateway in an IP network, said arrangement comprising:

means in the originating gateway for reserving call handling resources in the originating gateway for an end to end test;

means for establishing a session between the originating gateway and the destination gateway;

means in the originating gateway for sending a seizure signal from the originating gateway to the destination gateway upon establishment of the session, said seizure signal indicating that the end to end test is to be performed, which interface to use for the test, a codec to be utilized for the test, and a desired number of call handling resources to be used for the test;

means in the originating gateway for receiving a resource ready acknowledgment signal from the destination gateway, said acknowledgment signal indicating that the desired number of resources are available in the destination gateway;

means in the originating gateway for configuring the reserved call handling resources in the originating gateway with appropriate data for the test in response to the acknowledgment signal from the destination gateway;

means in the originating gateway for sending a plurality of test data packets with the data for the test to the destination gateway;

means in the destination gateway for distinguishing the test data packets from other data traffic on the basis of the source address field in the test data packet headers;

means in the destination gateway for looping back the received test data packets to the originating gateway by exchanging source and destination address fields in the packet headers of the test data packets, while sending other data traffic to defined destinations;

means in the originating gateway for receiving the looped back test data packets;

means in the originating gateway for calculating quality statistics for the received data packets by the originating gateway, the quality statistics includes dropped packets, round trip delay, and jitter.

4. The arrangement according to claim 3, further comprising means in the originating gateway for specifying in the seizure signal, a time interval for performing the test.

* * * * *